2
3
7
6
5
4
1

United States Patent Office

Re. 28,291
Reissued Dec. 31, 1974

28,291

SPRING-LOADED CLAMPING DEVICES FOR FASTENING RAILROAD RAILS

Alf Lennart Borup, Bromma, and Karl Rune Hamrin, Lesjofors, Sweden, assignors to Lesjofors AB, Lesjofors, Sweden Original No. 3,749,310, dated July 31, 1973, Ser. No. 152,154, June 11, 1971. Application for reissue Oct. 29, 1973, Ser. No. 410,379
Claims priority, application Switzerland, June 12, 1970, 8,162/70
Int. Cl. E01b 9/02
U.S. Cl. 238—349 3 Claims

Matter enclosed in heavy brackets [ ] appears in the original patent but forms no part of this reissue specification; matter printed in italics indicates the additions made by reissue.

ABSTRACT OF THE DISCLOSURE

Clamping devices for fastening railroad rails to a support with the aid of a clamping means one end of which exerts a pressure against the rail foot while the other end thereof is disposed in a resilient fastening which exerts the pressure force via the clamping means against the rail foot, the fastening having a spring characteristic with a flat return curve provided by an extended spring travel stroke for at least one spring in the fastening.

This invention relates to spring-loaded clamping devices for fastening all types of rails. Such devices are described particularly in Swedish Patent Specifications 185,760, 185,763 and 304,769 and have been widely used. However, these proviously known clamping devices are associated with substantial drawbacks, particularly with regard to the spring characteristic, the number of components and the associated matching of tolerances, the possibility of mechanized assembly, and the insulating plate which is to be inserted between the clamping device and the rail and which risks being crushed at the assembly because it is not relieved of load at the assembly, whereby the requisite electrical insulation is frequently destroyed with ensuing disturbances in the electrical signalling system. The previously known fastenings of such devices cannot either compensate for tolerance faults resulting from the manufacture of concrete sleepers. By reason of the short spring travel stroke and the spring characteristic conditioned thereby, the properties of the fastening are altered on mounting and dismounting the rail, so that upon re-laying of the rail the clamping power of the device against the rail will not display the original properties any more.

For the elimination of these drawbacks the present invention provides a clamping device for fastening a railroad rail to a support, comprising a fastening which is fixedly arranged in the rail support, and a clamping means disposed between the fastening and the rail foot, wherein the fastening consists of at least one spring having an extended spring travel stroke and is provided with a substantially U-shaped holder for one end portion of the clamping means the other end portion of which is adapted to bear against the rail foot.

The clamping device according to the invention comprises two main parts, viz. a resilient fastening fixedly arranged in the support, and a clamping means disposed between said fastening and the rail foot. One device of this type including a fastening and a clamping means is placed on each side of the rail. The fastening is provided with a substantially U-shaped gap which can be widened by means of a suitable mounting tool to permit insertion into the gap of the clamping means in the unloaded state thereof. The fastening may be of optional geometrical shape in cross section, but should preferably be square, rectangular or round. The fastening may be composed of one or more substantially parallel spring elements, which are individually designed so as to provide the desired spring properties collectively. Like the fastening the clamping means can also be given an optional cross sectional shape, but it should preferably be rectangular, square or round and comprise one or more substantially parallel parts.

At the surface of engagement with the rail the clamping means may be equipped with an electric insulator, i.e., of nylon, which may be detachably or fixedly united with the clamping means. The insulation can also be combined with a lateral support between the rail and the fastening. The said support can be a separate member providing an insulation between the rail and the fastening details.

The clamping means is of such a configuration that it can be housed in cassettes on either side of a wagon which can be driven over the laid-out rails and has a tool for forcing the fastening open and for automatically inserting the unloaded clamping means from the side or from in front, whereupon the tool is relieved and the clamping means is pressed against the rail foot. Mounting is also easily realized with simple hand tools. Owing to the configuration of the fastening a certain equalization will take place in the mounting operation, whereby a definite pressure force is obtained irrespective of the existing variations in the vital measurements of the fastening details and their position relative to the rail support.

The invention is more fully described hereinbelow with reference to the accompanying drawings in which.

Figure 1:
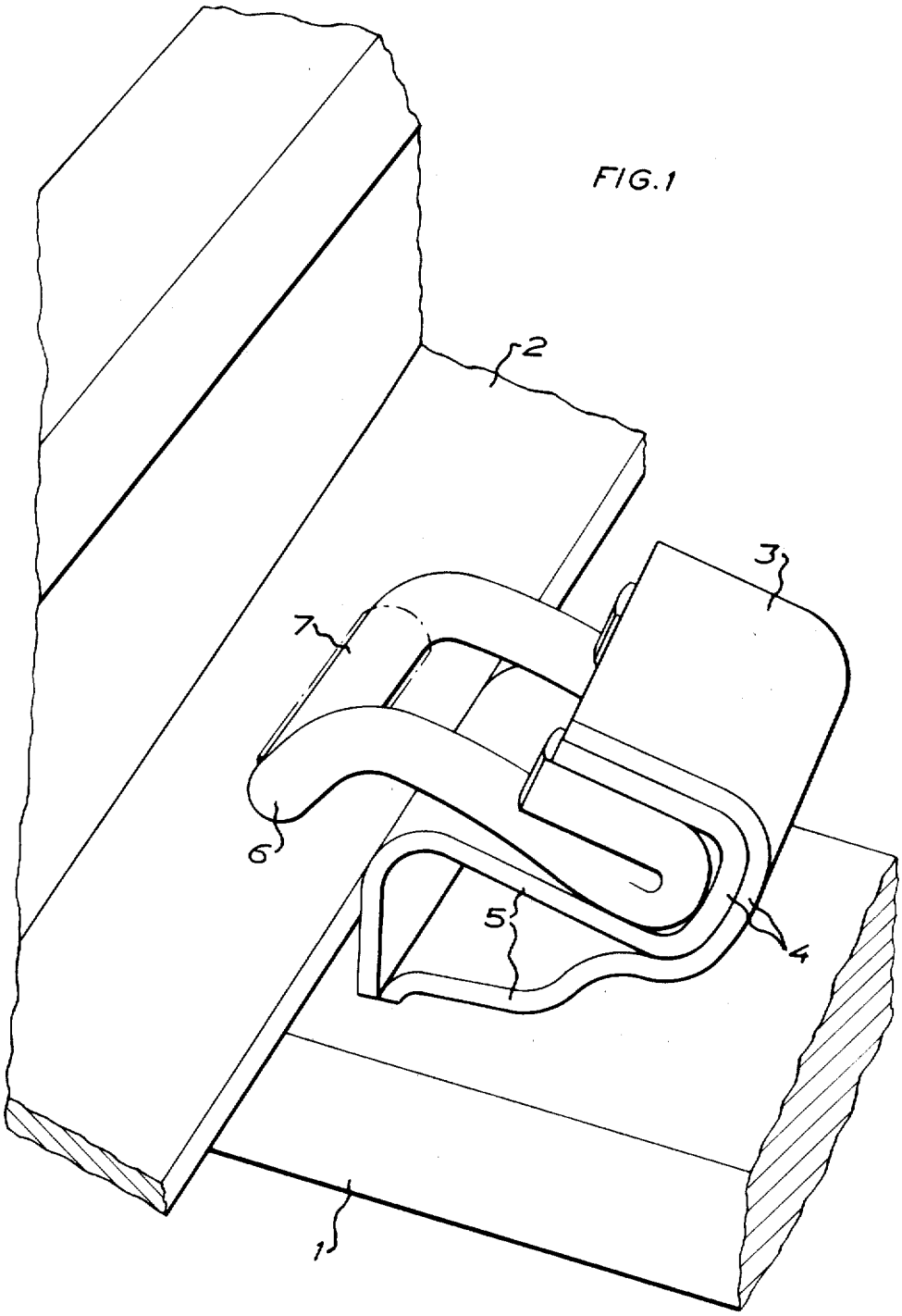
FIG. 1 shows a perspective view of a fastening comprising spring leaves.
Figure 4:
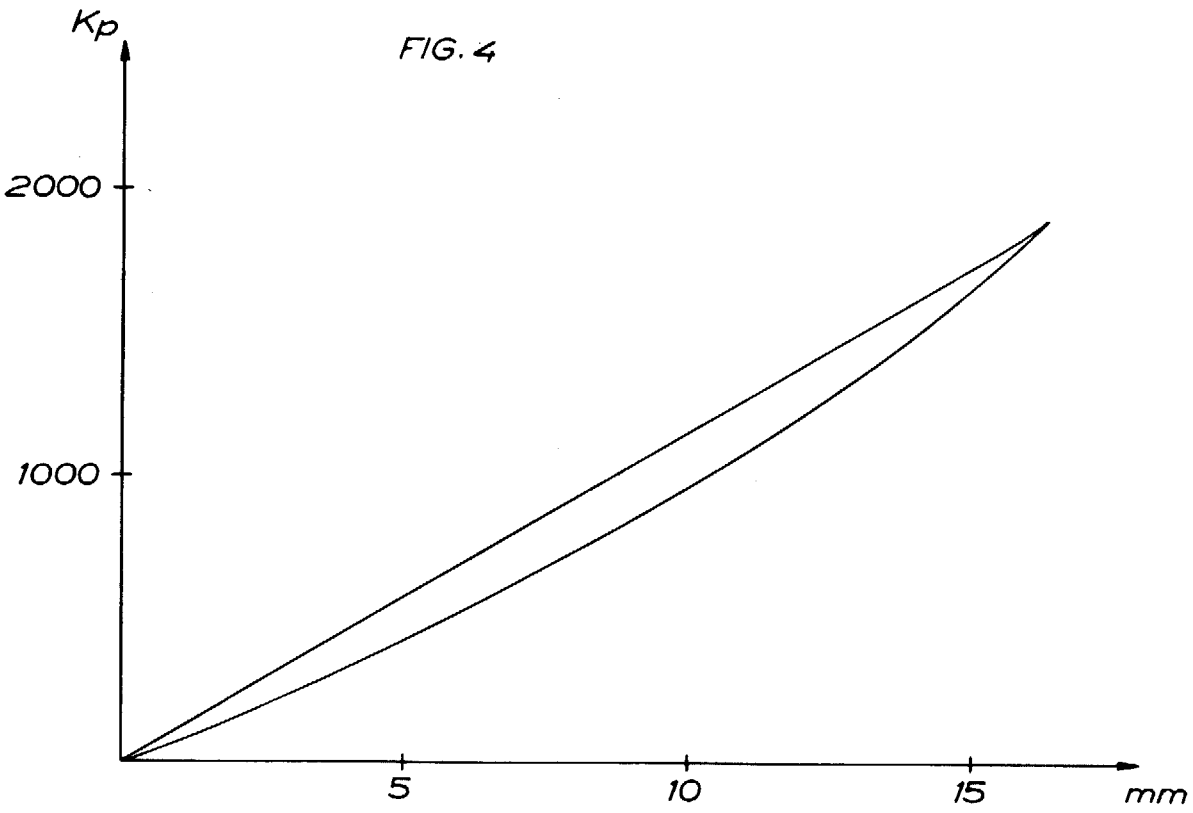
FIG. 4 shows the spring characteristic of the springs in the fastening.

As shown in FIG. 1, a resilient fastening 3 is secured in a support 1 of concrete, iron, wood or other suitable material. In the embodiment illustrated the fastening 3 comprises two leaf springs 4 which have their outer ends reversely bent into U-shape so as to form a holder. The spring leaves 4 present an extended spring travel stroke 5 and, in the case of concrete sleepers, are embedded in the support, as is most clearly seen from FIG. 2. The two spring leaves show in combination a spring characteristic which is illustrated in FIG. 4, that is, the spring leaves have a very flat return curve.

A clamping means 6 which, in the embodiment illustrated, is made of round iron, is inserted in the U-shaped holder of the fastening 3. The free ends of the clamping means 6 have their extremities reversely bent where they are received in the fastening 3, and the part of the clamping means facing the rail foot and exerting pressure thereagainst is bent down against the rail foot. An insulation 7, preferably of nylon, is provided on the limb of the clamping means engaging the rail foot 2. Instead of the insulating sleeve 7 illustrated, a plate of for instance nylon may be disposed between the clamping means 6 and the rail foot 2.

Figure 2:
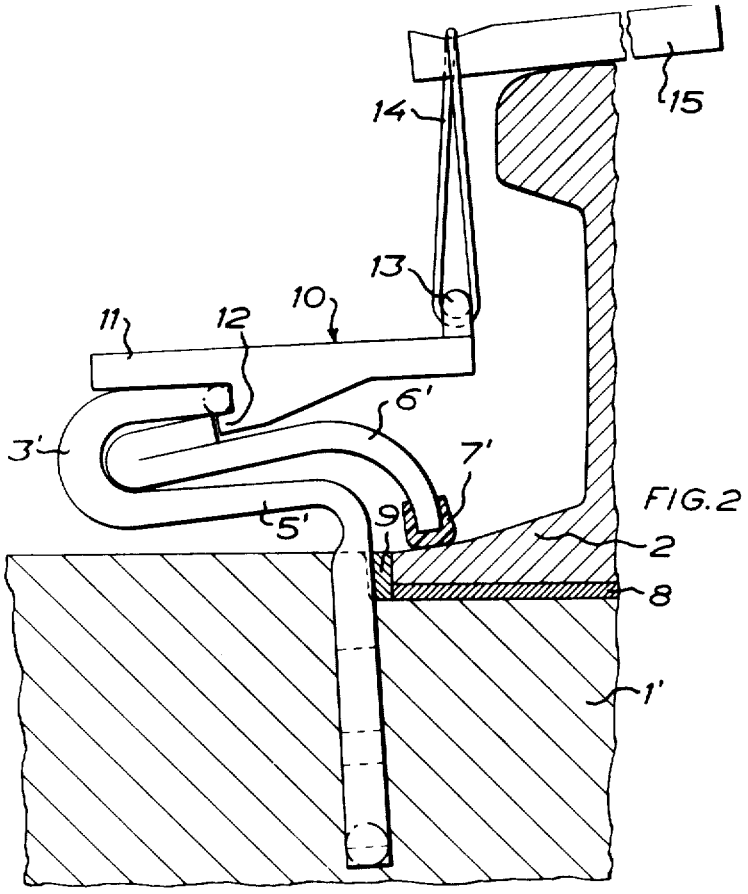
FIGS. 2 and 3 show a side view and plan view, respectively, of a fastening comprising springs of round spring steel.
Figure 3:
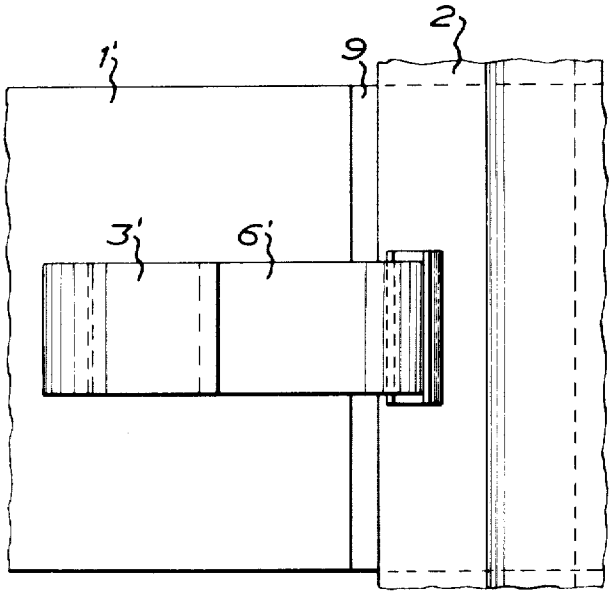

In the embodiment shown in FIG. 2 the spring 3' of the fastening is made from round spring steel bent into U-shape. Same as in FIG. 1, the fastening is of U-shape so as to accommodate a clamping means 6' which in this case is a bent leaf spring. An insulation 7' is provided between the clamping means 6' and the rail foot 2. Instead of the insulation 7', plates 8 and 9 of insulating material can be inserted between the rail foot 2 and the support 1′ and between the rail foot 2 and the fastening 3′, respectively.

FIG. 2 also shows a simple tool for moving the spring 3 and 3′, respectively, apart in the fastening. This tool 10 comprises a lever arm 11 with an abutment 12 which is insertable into the upper portion of the fastening, and a pin 13 projecting from one end of the lever arm 11. A wire 14 or like means is run between said pin 13 and a lever arm 15 engaging the rail, so that by depression of the lever arm 15 the spring 3 and 3′, respectively, in the fastening will be moved apart to permit free insertion of the clamping means 6 and 6′, respectively. When the tool is withdrawn the fastening 3 will fixedly grip the clamping means 6. Because of the spring characteristic of the springs in the fastening the return flexure thereof will take place very gently, thus altogether eliminating any risk of the insulation 7 being crushed. The spring properties of the spring leaves 4 of the fastening 3 are not affected by the leaves being so moved apart, but will remain entirely unaltered.

The advantages gained by the clamping device according to the present invention are as follows:

a large spring travel stroke, which makes the clamping device insensitive to tolerance faults in the concrete sleepers manufactured;

large force of retention to movements of the rails;

the mounting and dismounting operations can be mechanized, without altering the properties of the clamping device;

the clamping devices are disposed only on the top faces of the sleepers;

the clamping device has a minimum of constituent parts;

favourable electric insulation, with the possibility of an easy exchange thereof.

As indicated in FIG. 1, the ends of the two spring leaves 4 are connected together in the support 1 and the intermediary portions 5 are bent apart, one spring part having a large surface of engagement with the support while the other spring part has a considerably extended spring travel stroke. The extremities of the two free ends of the spring leaves bear against one another in the fastening.

What we claim and desire to secure by Letters Patent is:

1. A clamping device for fastening a railroad rail to a support, comprising a fastening which is fixedly arranged in the rail support, and a clamping means disposed between the fastening and the rail foot, wherein the fastening consists of two spring leaves which have their end portions connected together and disposed in the support while the intermediary portions of the spring leaves are bent apart, the spring part facing the support having a large surface of engagement therewith and the other spring having an extended spring travel stroke and the extremities of the two free ends of the spring leaves bearing against one another and forming a substantially U-shaped holder for one end portion of said clamping means, the other end portion of which is adapted to bear against the rail foot.

2. A clamping device for fastening a railroad rail to a support, comprising a fastening which is fixedly arranged in the rail support, and a clamping means disposed between the fastening and the rail foot, wherein the fastening consists of at least one spring having an extended spring travel stroke and is provided with a substantially U-shaped holder, one end portion of said clamping means being reversely bent to be supported in the U-shaped holder and the other end of said clamping means adapted to bear against the rail foot.

3. A clamping device for fastening a railroad rail to a support, comprising leaf spring means, a first end portion of said leaf spring means adapted to be anchored in the support and protruding upwards therefrom adjacent the rail foot, and a second end portion integral with said first end portion and bent first away from the rail and then reversely bent upwards and towards the rail to form a substantially U-shaped holder open towards the rail, and a rigid clamping means having one end inserted in the U-shaped holder and another end bearing against the rail foot.

References Cited

The following references, cited by the Examiner, are of record in the patented file of this patent or the original patent.

UNITED STATES PATENTS

| | | | |
|---|---|---|---|
| 3,347,462 | 10/1967 | Rolfsen | 238—349 |
| 2,357,498 | 9/1944 | Boyce et al. | 238—349 |
| 2,844,326 | 7/1958 | Van Der Weyjen | 238—349 |
| 2,535,337 | 12/1950 | Wertz | 238—349 |
| 2,535,353 | 7/1944 | Myer | 238—349 |

M. HENSON WOOD, Jr., Primary Examiner

R. A. BERTSCH, Assistant Examiner

UNITED STATES PATENT OFFICE
CERTIFICATE OF CORRECTION

Patent No. RE 28291 Dated December 31, 1974

Inventor(s) Alf Lennart Borup et al

It is certified that error appears in the above-identified patent and that said Letters Patent are hereby corrected as shown below:

In the Heading after "Claims Priority" change "Switzerland" to --Sweden--

Signed and sealed this 4th day of March 1975.

(SEAL)
Attest:

RUTH C. MASON
Attesting Officer

C. MARSHALL DANN
Commissioner of Patents
and Trademarks

USCOMM-DC 60376-P69
* U.S. GOVERNMENT PRINTING OFFICE : 1969 O—366-334.